United States Patent [19]
Gilbert

[11] 3,948,047
[45] Apr. 6, 1976

[54] HYDRAULIC VEHICLE DRIVE SYSTEM
[76] Inventor: Gene D. Gilbert, 1803 E. Fairmont, Phoenix, Ariz. 85016
[22] Filed: Oct. 29, 1974
[21] Appl. No.: 518,232

[52] U.S. Cl. .................. 60/325; 180/66 R; 415/202
[51] Int. Cl.² ........................................ F15B 15/18
[58] Field of Search ............ 60/325, 394, 477, 483, 60/493; 180/66 R, 66 F, 67

[56] References Cited
UNITED STATES PATENTS

| | | | |
|---|---|---|---|
| 2,468,828 | 5/1949 | Kopp | 180/66 R X |
| 3,379,008 | 4/1968 | Manganaro | 60/408 R X |
| 3,828,880 | 8/1974 | Smith | 180/66 R |

*Primary Examiner*—Edgar W. Geoghegan
*Attorney, Agent, or Firm*—Gregory J. Nelson

[57] ABSTRACT

A hydraulic drive system is disclosed. A power wheel or turbine is supplied with motive fluid from a hydraulic pump driven by an appropriate prime mover. The power wheel has oppositely disposed valve plates which alternately register with cavities disposed around the periphery of the wheel to define isolated pressure chambers. A sequencing valve alternately delivers fluid pressure to the pressure chamber in registry with a valve plate. A drive shaft transversely extends from the wheel and is adapted to be coupled to the driving wheels of a vehicle.

4 Claims, 5 Drawing Figures

HYDRAULIC VEHICLE DRIVE SYSTEM

The present invention relates to a hydraulic fluid pressure system for driving a vehicle and more particularly to a system in which fluid under pressure is directed against a turbine wheel to generate rotary power to drive a vehicle.

A number of hydraulic drives for vehicles can be found in the prior art. Generally these hydraulic drive systems are utilized only in light duty utility vehicles. A conventional system of this type comprises a prime mover, a pump such as a gear pump and a suitable hydraulic motor such as a vane motor drivingly connected to power the vehicle wheels. Suitable control valves are interposed between the pump and motor to control speed and direction of operation. More sophisticated systems of this general type are known as hydrostatic transmissions and use variously matched components to achieve the desired operating characteristics. For example, hydrostatic drives are generally classified as having constant or variable torques and/or horsepower. Torque ranges of hydrostatic transmissions can also be varied depending upon the ultimate application. For example, the torque range of a hydrostatic drive for use in automobiles is generally narrow while a drive for a vehicle such as a truck or shovel loaders requires a wide range of torque.

While hydrostatic transmission systems of the type generally described above are desirable from the standpoint that they provide a wide range of operating characteristics, such systems are complex often requiring sophisticated components such as variable displacement piston pumps and motors and complicated controls in the form of pressure compensators and flow control values.

In an effort to provide vehicle fluid drive systems of a more simplified nature, attempts have been made at utilizing large diameter fluid driven turbines. For example, Kopp patent, Pat No. 2,468,828 shows the use of a turbine type hydraulic motor in a vehicle drive system.

Others in the field have utilized turbines in connection with pneumatic fluid pressure systems. U.S. Pat. No. 3,379,008 shows the turbine having a vane rotor within its shaft connected to a transmission and responsive to compressed air to propel the vehicle. The turbine of both the aforementioned patents are generally conventional in construction and are of the impulse type wherein fluid, either hydraulic or pneumatic is directed to impinge on a blade causing the turbine to rotate. However, none of these turbine type drives have found acceptance in the vehicle field.

The present invention relates to an improved vehicle drive system which utilizes a turbine wheel of improved design. The drive system of the present invention includes a source of power such as a hydraulic pump driven by an electric motor, gasoline engine or the like. The output of the pump is connected across a suitable sequencing valve to a rotor or power wheel unit. The rotor is provided with a series of peripheral depressions or cavities. A pair of valve plates oppositely cooperate with the cavities to sequentially seal off and isolate the cavities. As a cup is sealed off in registry with a valve plate, fluid pressure is directed into the cavity by an appropriately oriented nozzle and reactive forces cause the wheel to rotate. Diametrically opposed cavities are alternately pressurized so that the rotor is oppositely pushed. The rotor is connected to a shaft which, in turn, may directly be connected to the driving axle of a vehicle or preferably is connected across a conventional automatic or manual transmission to effect speed and torque changes and to obtain reversibility of operation.

A more complete understanding of the present invention will become apparent from consideration of the following specifications and drawings in which.

Figure 1:
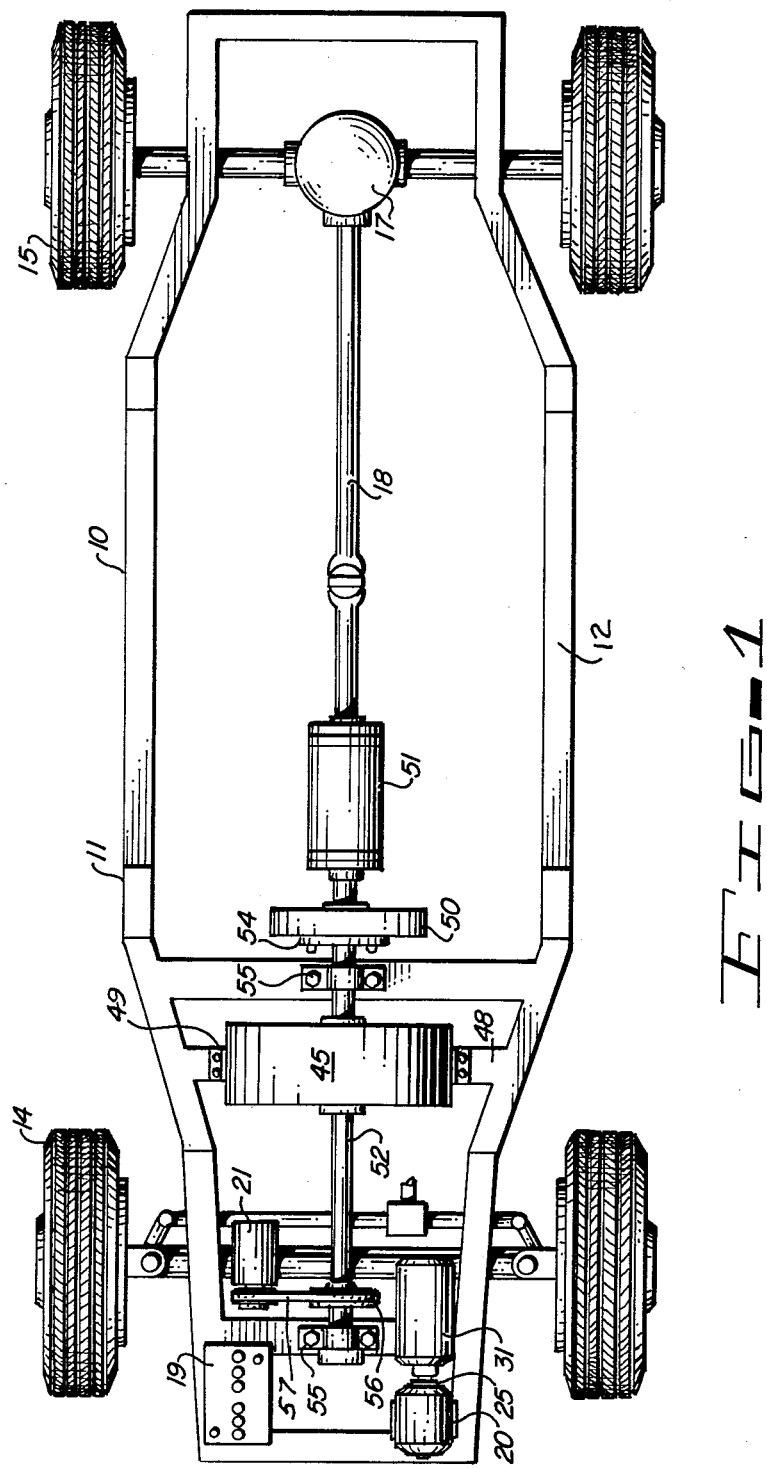
FIG. 1 is a plan view of a vehicle chassis with the hydraulic drive of the present system installed therein.
Figure 2:
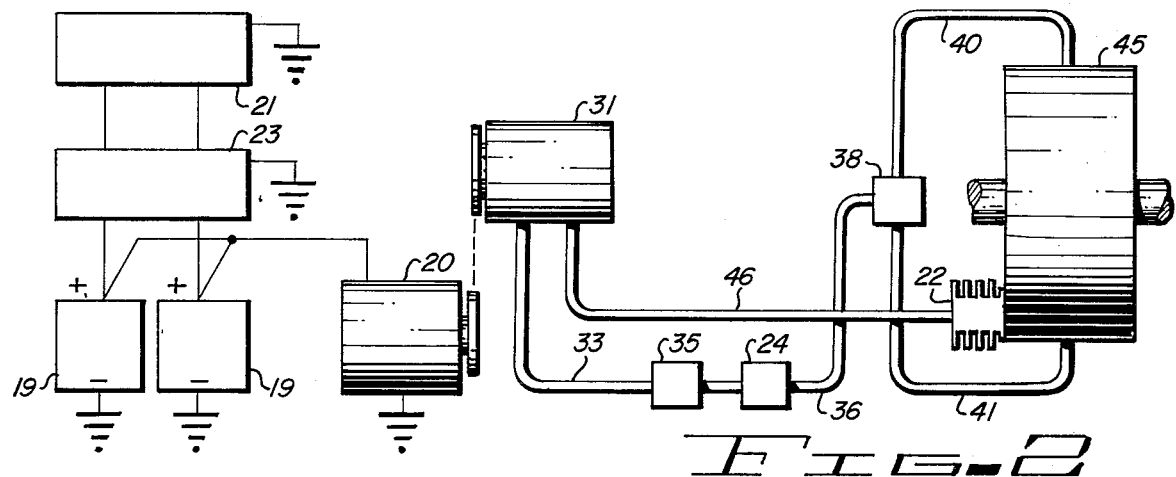
FIG. 2 is a diagrammatic representation of the drive system of the present invention.

Turning now to FIGS. 1 and 2, the drive system of the present invention is shown in connection with a conventional vehicle chassis designated by the numeral 10 having opposite main frame members 11 and 12. Steerable front wheels 14 are mounted on chassis 10. Rear wheels 15 are suitably driven by rear axles through differential assembly 17 and drive shaft 18.

The system may be powered by any suitable prime mover such as electric motor 20. Preferably several batteries 19 are operatively connected to motor 20 and are controlled by voltage sensing means 23 to selectively connect the battery with the greatest potential to the electric motor. The remaining battery serves as an auxiliary. A conventional charging system including alternator 21 and an appropriate voltage regulator 23 maintains the electrical potential of batteries 19.

The output shaft 25 of electric motor 20 is coupled to the input shaft of hydraulic pump 31. Pump 31 can be directly coupled to the electric motor or may be driven through a belt and pulley arrangement in order to meet input and speed requirements. Hydraulic pump 31 is of the positive displacement type and may be of vane, gear, piston or similar construction. Preferably pump 31 is of the fixed displacement type. The output port of hydraulic pump 31 is connected by conduit 33 to control valve 35. Valve 35 is in hydraulic communication by line 36 with shuttle or sequencing valve 38. Parallel hydraulic lines 40 and 41 connect the output ports of sequencing valve 38 to the opposite sides of power wheel 45. Return line 46 communicates the reservoir or sump within the drive unit 45 with pump 31. A heat exchanger 22 cools the hydraulic fluid. A relief valve 24 protects the system and diverts pump delivery to reservoir to limit system pressure to a predetermined maximum valve. The details of the components will be described in more detail hereafter.

Figure 4:
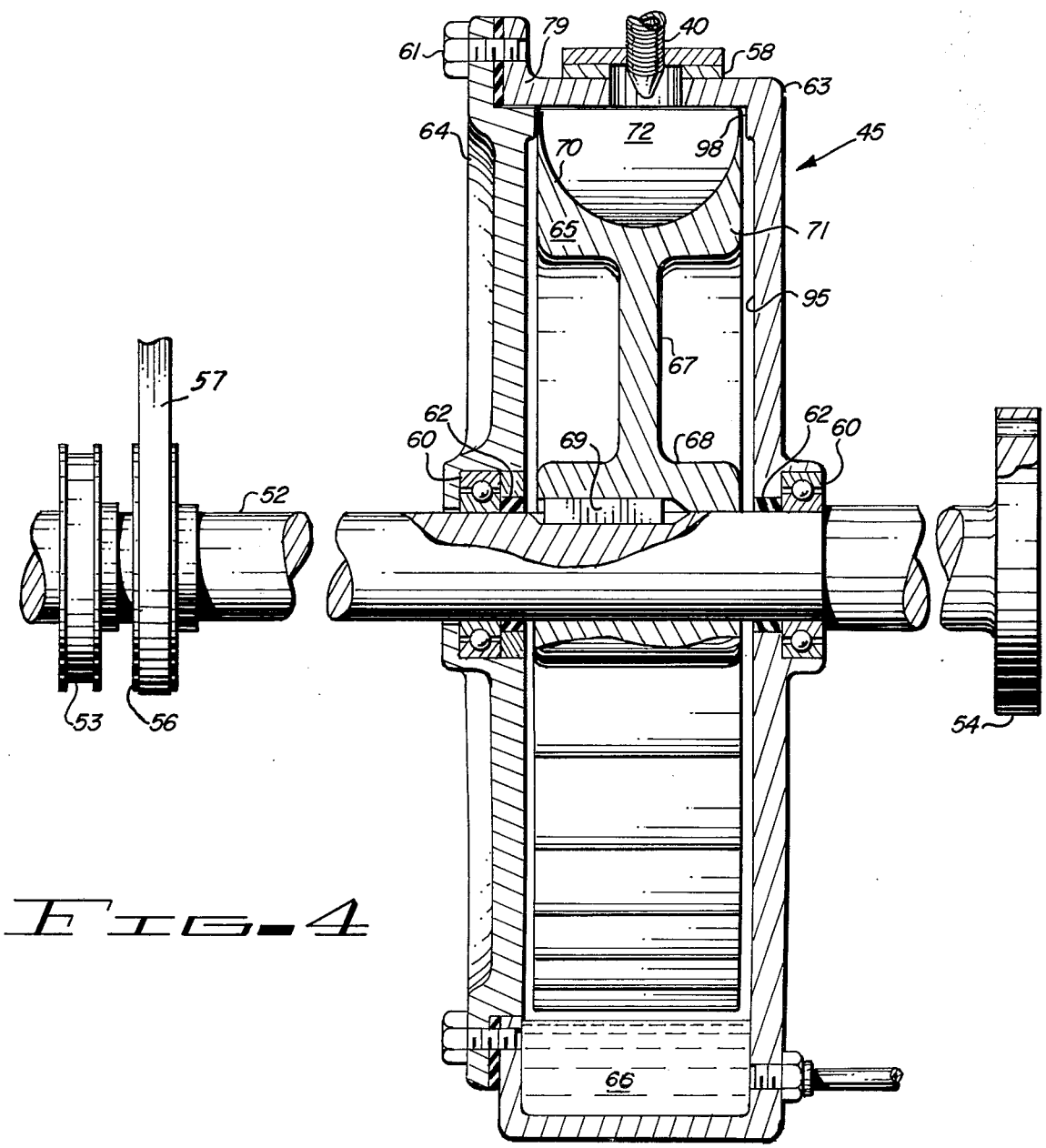
FIG. 4 is a cross-sectional view of the power wheel taken along lines 4—4 of FIG. 3.

Drive unit 45 is secured to frame cross member 48 of chassis 10 by suitable mounting brackets 49. Output shaft 52 of drive unit 45 extends axially within chassis 10 and carries a mounting flange 54 at one end. Flange 54 can be directly connected to drive shaft 18 or preferably is connected to a flywheel 50. Conventional standard or automatic transmission 51 is interposed ahead of the differential and axle assembly 17. Bearing assemblies 55 at either end of shaft 52 are secured on chassis and provide a mounting for shaft 52. Pulley 56 is carried on shaft 52 and may be suitably connected by belt 57 to alternator 21 and to any additional auxiliary systems. As best seen in FIG. 4 an additional pulley 53 and shaft 56 serves as a power take off for auxiliary vehicle systems.

Figure 3:
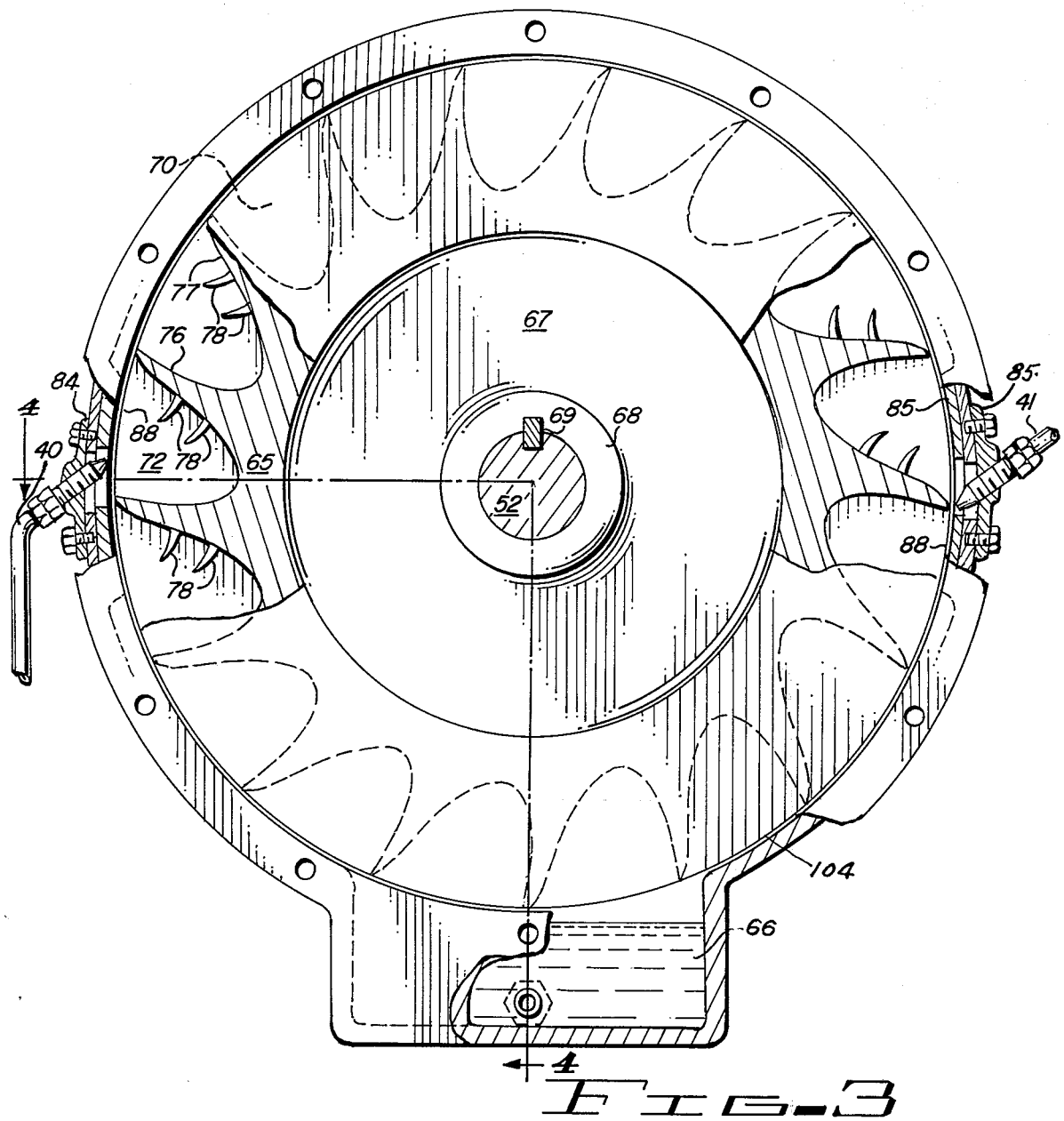
FIG. 3 is a vertical cross-sectional view of the power wheel assembly.
Figure 5:
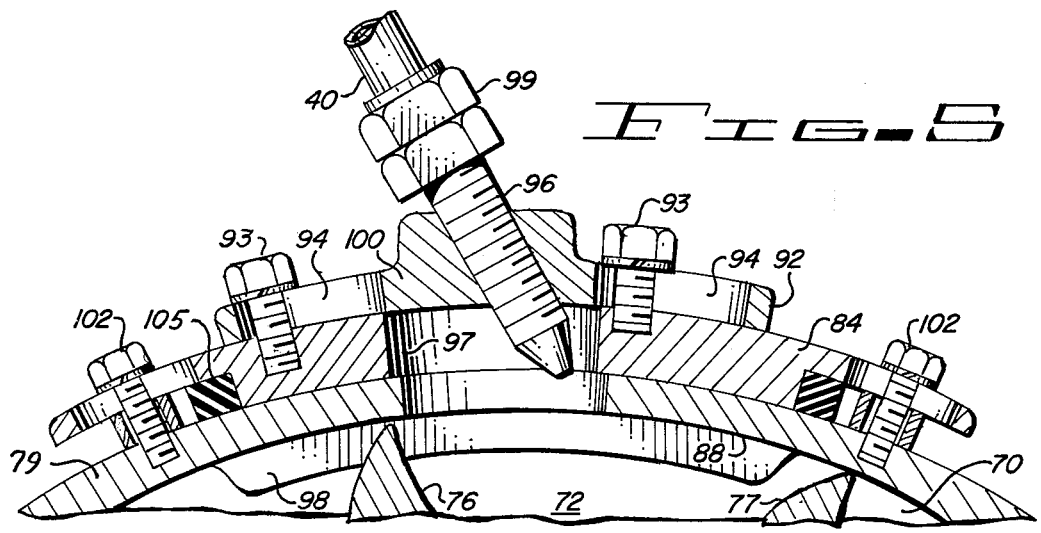
FIG. 5 is a partial detail view illustrating a portion of the turbine wheel assembly.

Power wheel 45 is shown in greater detail in FIGS. 3 through 5. Referring now to those figures, power unit 45 is enclosed within a suitable housing or casing 58 having opposite parallel side plates 63 and 64 and circumferential wall 79. The housing members are joined at mating flanges by bolts 61. Shaft 52 extends through opposite side plates 63 and 64 and is mounted for rotation in anti-friction bearings 60. Packing glands or seals 62 prevent fluid leakage along shaft 52 from the interior of housing 58.

Contained within housing 58 is the turbine or rotor 65. The power wheel or rotor 65 has a hub 68 joined to shaft 52 at keyway 69. A peripheral rim 71 is carried on radial ring 67. A series of similar cup-like cavities 70 are formed in rim 71. The series of cavities are defined by opposite walls 76 and 77. Rotor 65 can be cast or machined from a single piece of stock or could be fabricated by joining opposite circular side pieces to a suitable formed peripheral member to form the cavities.

The preferred configuration of the individual cavities 72 is best seen in FIG. 3. It will be noted that each cavity has a wall 76 which extends generally radially and an intersecting wall 77 which forms an angle of approximately 30 to 60 degrees with wall 76. The cavities extend to one or more vanes 78 that may project from wall 77. Vanes 78 are preferably curved as best seen in FIG. 4.

Valve plates 84 and 85 are oppositely disposed in housing 58. Each of the valving plates has a curved inner surface 88 which projects radially inwardly in sealing engagement with the tips of the rotor blades. The peripheral length of each of the valving plates 84 and 85 correspond approximately to the peripheral distance between adjacent blade tips. The valve plates are arranged so that each plate will completely isolate a single cavity 70 forming a closed pressure chamber 72 when a cavity is in registry with the plate. It will also be noted that there are uneven numbers of cavities 70 disposed around the periphery of rotor 45, so that when one chamber 72 is isolated beneath the valve plate the diametrically opposed chamber has moved to a position out of registry with the opposed valve plates. Therefore when a cavity is in registry with a valve plate, valve plate surface 88 and sidewall lands 98 seal the chamber. Once a cavity is out of registry with a plate, peripheral clearance 104 and lateral clearance space 95 allow fluid to flow from the cavities to the sump 66.

Means are provided to "time" the valving. Each plate 84, 85 is slotted at 105 so that the plate can be peripherally adjusted relative to housing member 79. Bolts 102 secure the valve plate to housing member 79.

As best seen in FIG. 5, a slide plate 92 is secured to each of the valve plates 84 and 85. Slide plates 92 are provided with aligned slots 92 which receive bolts 93 so that peripheral adjustment of the plates is permitted. Each plate 92 has an angular threaded bore which receives an externally threaded hydraulic nozzle 96. The discharge end of nozzle 96 depends into slot 97 in the subjacent valve plate. A conventional hydraulic fitting 99 connects the nozzle to its respective supply line 40 and 41. Nozzles 96 discharge toward wall 77 of fluid cavities 70. It may be desirable to pivotally mount nozzle 96 so that adjustment of the angle of discharge may also be varied.

Hydraulic lines 40 and 41 are connected to nozzles 96 at opposite sides of turbine 45 and to the outlet ports of sequencing valve 38. Sequencing valve 38 alternately pressurizes lines 40 and 41 in the hydraulic circuit so that hydraulic fluid is delivered to a nozzle area cavity 70 in sealed registry with the associated valve plate forming an isolated pressure chamber 72. Sequencing valve 38 may be of conventional construction for controlling sequencing of operation between two branches of a circuit. The sequencing valve may include a rotating or shuttling valve member which alternately directs fluid flow to either of two outlet branches, the rotating or shuttling member being controlled by an appropriate electric timer. Another construction for this type of valve includes a single inlet port and two outlet ports. In response to predetermined fluid pressure, a biasing spring within the valve is overcome and a valve spool shifts to direct incoming flow to the alternate outlet ports.

A more comprehensive understanding of the present invention will be had from the following description of operation. In use, electric motor 20 is energized by means of an appropriate switch. Hydraulic pump 31 is accordingly actuated and fluid pressure generated. The operator, by means of appropriately located control handle, shifts control valve 35 to a position permitting fluid to be delivered to sequencing valve 38. Sequencing valve 38 causes the pressure fluid to be alternately delivered to lines 40 and 41 to discharge fluid at oppositely disposed respective valve plates 84 and 85. For example, as pressure fluid is delivered at valve plate 84 through nozzle 96 the associated pressure chamber 72 in registry or isolated beneath the valve plate is pressurized. Fluid impinges on wall 77 of the chamber impelling the power wheel in a clockwise direction as seen in FIG. 3. In addition, the static pressure existing within the chamber also exerts a pressure force impelling the drive wheel in the same direction. The small vanes 78 tend to prevent turbulence within the chamber. As power wheel 45 rotates the pressure chamber beneath the valve plate 84 will rotate out of registry with its valve plate and the hydraulic fluid therein will be released along peripheral space 104 and lateral clearance spaces 95 to sump 66 within the housing. At the same time a pressure chamber on the opposite side of the power wheel will rotate into registry beneath valve plate 85. Simultaneously, sequency valve 38 will shift diverting hydraulic fluid pressure through line 41 to cause pressurization of the valve chamber then in registry with valve plate 85. This alternate operation continues and delivers continuous power to shaft 52 to drive the vehicle. Thus, the power wheel is oppositely impelled or driven at its periphery by the sequenced, alternate admission of fluid pressure at the oppositely disposed valve plates. Hydraulic fluid collecting within sump 66 within housing 58 is returned to hydraulic pump 31 via line 46. Heat exchanger 22 dissipates heat from the fluid system. It is important to note that the device is self-lubricating and that the hydraulic fluid serves to decrease friction and wear between the valve plates and wheels.

Another advantage in the design of the present invention is that the power wheel delivers substantial rotational energy. The drive system of the particular invention can be used in connection with conventional vehicles and is also particularly well suited for utility vehicles and golf carts. The system components can be designed and selected to provide varying torque and speed characteristics. The hydraulic system of the present invention is extremely simple having a minimum of moving parts and can be adapted to almost any installation requirement. The drive of the present invention can be used without the requirement of any transmission as the fly wheel can be directly connected to the driving wheels of the vehicle or the drive shaft ahead of the differential. Speed changes can be effected by means of the throttling or control valve.

It will be obvious to those skilled in the art to make various changes, alterations and modifications to the invention herein described. To the extent that those changes, alterations and modifications do not depart from the spirit and scope of the appended claims, they are intended to be encompassed herein.

I claim:
1. A fluid pressure system comprising:
 a. a source of hydraulic fluid pressure;
 b. a sequencing valve in hydraulic communication with said source of hydraulic pressure having alternate outlet ports, said valve having means for selectively diverting fluid pressure between said outlet ports;
 c. a power means including:
  i. a rotor rotatively disposed within housing means, said rotor having a series of peripheral pressure cavities;
  ii. an output shaft connected to said rotor; and
  iii. valve plate means oppositely disposed relative to said rotor and adapted to selectively isolate cavities in registry therewith forming pressure chambers;
 d. fluid discharge means associated with said valve plate means oriented to direct fluid pressure toward said rotor; and
 e. means interconnecting said sequencing valve to said fluid discharge means whereby fluid pressure is selectively delivered to the said pressure chamber in registry with a valve plate to propel said rotor.

2. The system of claim 1 wherein said cavities are formed having a generally radial first wall and a second wall intersecting said first wall at an angle of from approximately 30° to 60°.

3. The system of claim 1 wherein said valve plate and said nozzle are each peripherally adjustable relative to the rotor housing means to "time" the operation of the rotor.

4. The system of claim 1 wherein said output shaft is provided with means adapted to couple said shaft to a vehicle drive shaft and wherein said output shaft carries auxiliary power take-off means.

* * * * *